United States Patent
Staal et al.

(10) Patent No.: US 12,275,482 B1
(45) Date of Patent: Apr. 15, 2025

(54) REAR WHEEL AND FOOT PEG LINKAGE MECHANISM FOR PERSONAL TRANSPORT DEVICE

(71) Applicants: Honda Motor Co., Ltd., Tokyo (JP); JD Components Co., Ltd., Taichung (TW)

(72) Inventors: Matthew B. Staal, Torrance, CA (US); Jackie P. Porchay, Torrance, CA (US); Michael Jin Kim, Long Beach, CA (US); Ming Hsein Lee, Taichung (TW); Ding Jong Chou, Taichung (TW); Sheng Yu Huang, Taichung (TW)

(73) Assignee: HONDA MOTOR CO., LTD., Tokyo (JP)

( * ) Notice: Subject to any disclaimer, the term of this patent is extended or adjusted under 35 U.S.C. 154(b) by 387 days.

(21) Appl. No.: 17/708,359

(22) Filed: Mar. 30, 2022

(51) Int. Cl.
*B62K 15/00* (2006.01)
*B62K 3/00* (2006.01)
*B62K 21/22* (2006.01)

(52) U.S. Cl.
CPC ............ *B62K 15/006* (2013.01); *B62K 3/002* (2013.01); *B62K 21/22* (2013.01)

(58) Field of Classification Search
CPC B62K 15/006; B62K 15/00; B62K 2015/001; B62K 2015/003; B62K 2015/00; B62K 3/002; B62K 3/00; B62M 3/00; B62M 3/08; B62M 5/00; B62J 25/00; B62J 25/04; B62J 25/06; B62H 5/00; B62H 5/10; B62H 1/08; B62H 1/00
See application file for complete search history.

(56) References Cited

U.S. PATENT DOCUMENTS

| | | | | |
|---|---|---|---|---|
| 3,096,841 A | * | 7/1963 | May | B62K 15/00 280/291 |
| 3,934,669 A | * | 1/1976 | Adams | B62M 7/10 180/223 |
| 4,094,374 A | * | 6/1978 | Adams | B62D 61/02 280/278 |
| 5,097,922 A | * | 3/1992 | Stagi | B62K 15/006 280/37 |

(Continued)

FOREIGN PATENT DOCUMENTS

| CN | 2189583 Y | 2/1995 |
|---|---|---|
| CN | 102190040 B | 8/2013 |

(Continued)

*Primary Examiner* — James M Dolak
(74) *Attorney, Agent, or Firm* — Plumsea Law Group, LLC (57) ABSTRACT

A personal transport device convertible between a riding configuration and a stowed configuration is described. In one embodiment, a rear wheel and foot peg linking mechanism for the personal transport device includes foot pegs, including a first peg and a second peg, and a gear mechanism connected to the foot pegs. The gear mechanism is configured to rotate to move the foot pegs between an open position and a closed position. The rear wheel and foot peg linking mechanism also includes an arm connected to a rear wheel of the personal transport device and a post member extending outwards from the arm. The post member is configured to contact the gear mechanism to cause the gear mechanism to move the foot pegs from the open position to the closed position.

11 Claims, 10 Drawing Sheets

(56) References Cited

U.S. PATENT DOCUMENTS

| | | | |
|---|---|---|---|
| 5,347,913 A | 9/1994 | Stepner | |
| 5,819,868 A * | 10/1998 | Koike | B60L 15/10 |
| | | | 280/301 |
| 6,170,846 B1 * | 1/2001 | Holter | B62H 1/02 |
| | | | 280/297 |
| 6,719,316 B1 | 4/2004 | Anthony | |
| 6,957,821 B2 * | 10/2005 | Gorman | B62J 25/06 |
| | | | 74/564 |
| 7,159,884 B2 * | 1/2007 | Gu | B62K 15/006 |
| | | | 280/278 |
| 7,976,035 B2 | 7/2011 | Chan | |
| 9,701,355 B2 * | 7/2017 | Chang | B62J 25/04 |
| 9,873,477 B2 * | 1/2018 | Wunderlin | B62K 21/24 |
| 9,896,148 B2 * | 2/2018 | Baba | B62K 19/02 |
| 10,214,262 B2 | 2/2019 | Grolleau | |
| 11,021,203 B2 * | 6/2021 | Etzelsberger | B62K 11/02 |
| 11,858,578 B2 * | 1/2024 | Huang | B62J 25/00 |
| 11,932,302 B1 * | 3/2024 | Porchay | B62K 21/12 |
| 11,981,389 B1 * | 5/2024 | Kim | B62J 45/00 |
| 12,005,988 B1 * | 6/2024 | Staal | B62K 11/14 |
| 12,122,473 B2 * | 10/2024 | Ragland | B62K 9/00 |
| 12,145,682 B2 * | 11/2024 | Melville-Brown | B62J 50/22 |
| 12,145,687 B2 * | 11/2024 | De La Garza Grillo | |
| | | | B62J 43/16 |

FOREIGN PATENT DOCUMENTS

| | | |
|---|---|---|
| CN | 204161575 U | 2/2015 |
| CN | 106741447 A | 5/2017 |
| CN | 106741465 A | 5/2017 |
| CN | 207346021 U | 5/2018 |
| CN | 108146566 A | 6/2018 |
| CN | 207875887 U | 9/2018 |
| CN | 110254585 A | 9/2019 |
| CN | 210478924 U | 5/2020 |
| WO | 2016082738 A1 | 6/2016 |
| WO | 2017197725 A1 | 11/2017 |
| WO | 2018172308 A1 | 9/2018 |

* cited by examiner

REAR WHEEL AND FOOT PEG LINKAGE MECHANISM FOR PERSONAL TRANSPORT DEVICE

BACKGROUND

This disclosure relates generally to vehicles, and in particular to a rear wheel and foot peg linking mechanism for a compact personal transport device that is convertible between a stowed configuration and a riding configuration.

With rising prices of gasoline and automobiles, many people may turn to other more cost efficient modes of transportation such as, for example, mopeds, bicycles, scooters and, more recently, compact personal transport devices, such as electric scooters. These personal transport devices may be particularly popular for shorter trips in a city environment due to their compact size, ease of use, mobility, and the fact that they may be folded as needed for ease of portability. They may also be useful for covering the first mile or last mile of a trip which is the link between a user's origin or destination and another transportation means, hub or mass transit network. One existing barrier to widespread use of compact personal transport devices is the time needed to set up and collapse the devices before and after their use.

Accordingly, there is a need in the art for an improved compact personal transport device that can be set up and collapsed quickly.

SUMMARY

In one aspect, a rear wheel and foot peg linking mechanism for a personal transport device is provided. The rear wheel and foot peg linking mechanism including foot pegs, including a first peg and a second peg. The rear wheel and foot peg linking mechanism also including a gear mechanism connected to the foot pegs. The gear mechanism configured to rotate to move the foot pegs between an open position and a closed position. The rear wheel and foot peg linking mechanism further including an arm connected to a rear wheel of the personal transport device and a post member extending outwards from the arm. The post member is configured to contact the gear mechanism to cause the gear mechanism to move the foot pegs from the open position to the closed position.

In another aspect, a personal transport device is provided. The personal transport device including a sliding mechanism configured to move a rear wheel of the personal transport device between an extended position and a stowed position. The personal transport device also including an arm connected to the rear wheel of the personal transport device at one end and connected to the sliding mechanism at an opposite end. The personal transport device further including a post member extending outwards from the arm and a gear mechanism connected to foot pegs. The gear mechanism is configured to rotate to move the foot pegs between an open position and a closed position. Linear movement of the rear wheel along the sliding mechanism causes linear movement of the post member such that the post member is configured to contact the gear mechanism to cause the gear mechanism to move the foot pegs from the open position to the closed position.

In another aspect, a method of automatically transitioning foot pegs of a personal transport device between an open position and a closed position is provided. The method includes sliding a rear wheel of the personal transport device inwards into an outer casing of the personal transport device. The method also including engaging a post member attached to an arm connected to the rear wheel with a gear mechanism to cause the gear mechanism to rotate the foot pegs from the open position to the closed position.

Other systems, methods, features and advantages of the disclosure will be, or will become, apparent to one of ordinary skill in the art upon examination of the following figures and detailed description. It is intended that all such additional systems, methods, features and advantages be included within this description and this summary, be within the scope of the disclosure, and be protected by the following claims.

BRIEF DESCRIPTION OF THE DRAWINGS

The disclosure may be better understood with reference to the following drawings and description. The components in the figures are not necessarily to scale, emphasis instead being placed upon illustrating the principles of the disclosure. Moreover, in the figures, like reference numerals designate corresponding parts throughout the different views.

DETAILED DESCRIPTION

Embodiments of a compact personal transport device with a rear wheel and foot peg linking mechanism that assists with converting or transitioning the personal transport device between a riding configuration and a stowed configuration are described herein. The techniques described in connection with the present embodiments may be used to provide a personal transport device having a convenient rear wheel and foot peg linking mechanism that allows a user to quickly and automatically extend out foot pegs when the rear wheel is pulled out to the riding configuration. Similarly, the rear wheel and foot peg linking mechanism also allows the user to quickly collapse the rear wheel to automatically fold in the foot pegs in the stowed configuration. In the stowed configuration, the personal transport device has a compact form factor that allows a user to carry it in a primary vehicle, on public transportation, and/or on other forms of transportation to be used for "last-mile" or "first-mile" trips to and from a destination.

The example embodiments are described herein with reference to a personal transport device in the form of an electric scooter. As used herein, an electric scooter is a term used mainly to describe a scooter that is electrically powered. For example, this is a type of personal transport device that is gaining ridership in many locations. The principles of the example embodiments described herein may be applied to electric scooters or other types of personal transport devices, such as bicycles, unicycles, mopeds, skateboards, kickboards, wheelchairs, personal transporters, or the like.

In the example embodiments described herein, the electric scooter has an outer casing having a generally rectangular shape, including two flat sides having a length that is longer than a height. In addition, the electric scooter of the present embodiments has a width that is substantially smaller than the length and/or height of the electric scooter. In the example embodiments, the electric scooter may be transitioned between a riding configuration in which components of the electric scooter are in extended positions outside of the rectangular outer casing so that the electric scooter may be operated or ridden by a user to a stowed configuration in which components of the electric scooter are folded or stowed inside the outer casing.

Figure 1:
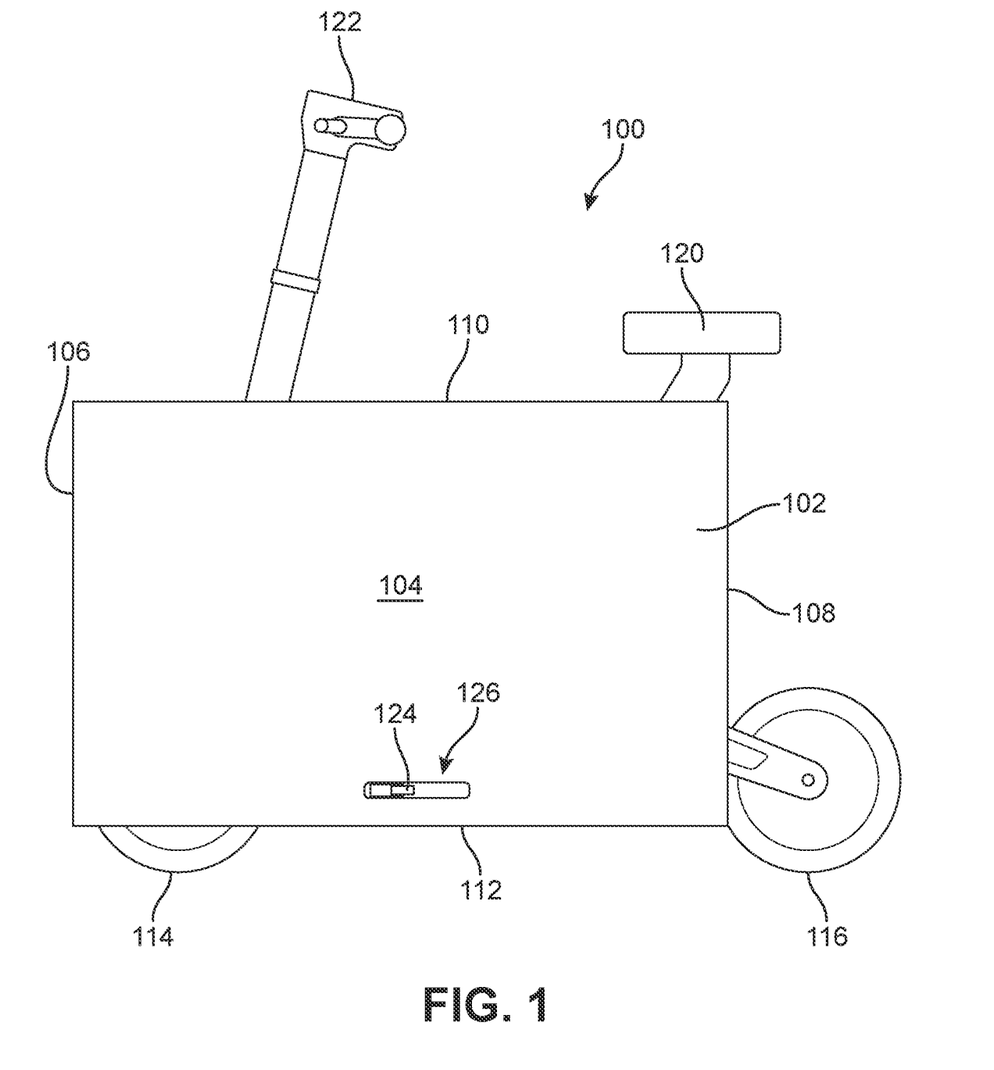
FIG. 1 is a side view of an example embodiment of a compact personal transport device in the form of an electric scooter in a riding configuration in accordance with aspects of the present disclosure.

Referring now to FIG. 1, an example embodiment of a personal transport device 100 (e.g., in the form of an electric scooter 100) is shown. In some embodiments, electric scooter 100 may be quickly transitioned or converted between a riding configuration in which components of electric scooter 100 are in extended positions outside of an outer casing 102 so that electric scooter 100 may be operated or ridden by a user to a stowed configuration in which components of electric scooter 100 are folded or collapsed to stowed positions inside outer casing 102. As shown in FIG. 1, electric scooter 100 is in the riding configuration.

In this embodiment, outer casing 102 of electric scooter 100 includes a first side surface 104 (shown in FIG. 1) and an opposite second side surface (not shown). Outer casing 102 has a width (W) between first side surface 104 and the opposite second side surface that defines a thickness of electric scooter 100. In an example embodiment, side surfaces of outer casing 102 are substantially flat, including each of first side surface 104 and the opposite second side surface. Outer casing 102 of electric scooter 100 extends between a front edge 106 and an opposite rear edge 108, as well as a top edge 110 and an opposite bottom edge 112. Front edge 106, rear edge 108, top edge 110, and bottom edge 112 are substantially straight and define an outer perimeter of rectangular-shaped outer casing 102 of electric scooter 100.

In this embodiment, a front wheel 114 is visible along bottom edge 112 of electric scooter 100 near front edge 106. Electric scooter 100 also includes a rear wheel 116 that is shown extended outside of outer casing 102 (i.e., in the riding configuration as shown in FIG. 1) along bottom edge 112 near rear edge 108. Rear wheel 116 is configured to slide or retract inside of outer casing 102 in the stowed configuration.

Electric scooter 100 includes a top surface disposed between first side surface 104 and the opposite second side surface. In some example embodiments, the top surface includes an opening extending substantially along the length of electric scooter 100 (i.e., from front edge 106 to rear edge 108). In one embodiment, the opening may be in the form of a slot disposed between first side surface 104 and the opposite second side surface.

In some embodiments, electric scooter 100 includes components configured to allow a user to ride electric scooter 100 in the riding configuration. For example, in this embodiment, electric scooter 100 includes a seat 120 and a steering assembly 122. In one embodiment, seat 120 is configured to mount to a seat post that is attached internally to the inside of electric scooter 100 (e.g., inside outer casing 102). For example, in one aspect the seat post may be attached internally via a pivot mechanism. Steering assembly 122 is configured to control orientation of front wheel 114 to allow a user to steer electric scooter 100 in the riding configuration. In an example embodiment, steering assembly 122 includes handlebars that are configured to receive hands of a user to steer front wheel 114. In some embodiments, steering assembly 122 may include additional components that allow a user to control electric scooter 100, such as, for example, throttle and brake controls, which may be located on the handlebars.

In some embodiments, electric scooter 100 may include foot pegs 124 that extend outward from side surface 104 of electric scooter 100 and provide a platform for a user to place or rest their feet while riding electric scooter 100. In an example embodiment, foot pegs 124 are configured to be folded out from a recess 126 in side surface 104 of electric scooter 100 near bottom edge 112. Foot pegs 124 pivot outward (e.g., 90 degrees) from a closed position where foot pegs 124 are folded inside recess 126 of electric scooter 100 in the stowed configuration to an open position where foot pegs 124 extend outwards approximately perpendicular to side surface 104 of outer casing 102 of electric scooter 100 in the riding configuration. Additionally, in the open position foot pegs 124 similarly extend out from the side surface opposite side surface 104 of electric scooter 100 so that a user may place their feet on foot pegs 124 on both sides of electric scooter 100 in the riding configuration. With this arrangement, foot pegs 124 are provided to allow a user to rest their feet above the ground surface while riding electric scooter 100.

It should be understood that a personal transport device according to the embodiments described herein may include additional components not shown or described. For example, a personal transport device in the form of an electric scooter (e.g., electric scooter 100) may include components such as a battery, throttle and brake controls, lights, etc. that allow a user to ride the electric scooter. Other embodiments of personal transport devices may also include additional or different components without departing from the techniques of the present embodiments described herein.

Figure 2:
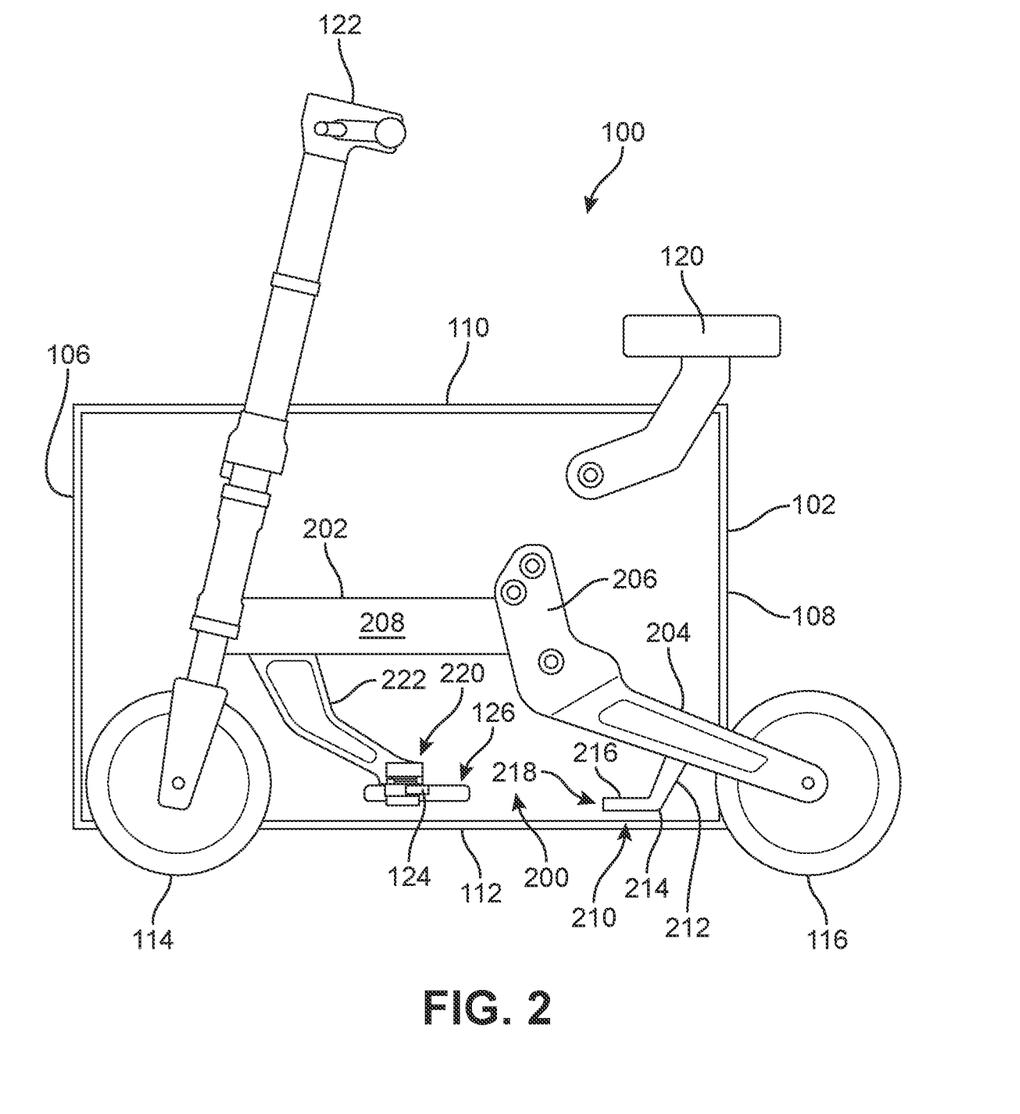
FIG. 2 is a side view showing internal components of the compact personal transport device of FIG. 1 in accordance with aspects of the present disclosure.

Referring now to FIG. 2, a side view showing the internal components of personal transport device in the form of electric scooter 100 is shown. In this view, outer casing 102 of electric scooter 100 is shown in cross-section so that the internal components are visible. In an example embodiment, electric scooter 100 includes a rear wheel and foot peg linking mechanism 200 (also referred to herein as "linking mechanism 200"). In some embodiments, linking mechanism 200 includes components associated with rear wheel 116 and components associated with foot pegs 124.

In an example embodiment, rear wheel 116 of electric scooter 100 is configured to move between an extended position outside of outer casing 102 of electric scooter 100 (e.g., in the riding configuration) and a stowed or collapsed position inside of outer casing 102. In some embodiments, a sliding mechanism 202 is configured to allow rear wheel 116 to move between the extended position and the stowed position. In an example embodiment, an arm 204 is attached to an axle of rear wheel 116 at one end and is attached to a carrier 206 at an opposite end. Carrier 206 is attached in a slidable manner to a track 208 of sliding mechanism 202. For example, carrier 206 may include a bearing assembly or similar apparatus to allow carrier 206 to slide back and forth along track 208 of sliding mechanism 202 in a substantially horizontal direction so that rear wheel 116 can move between the extended position and the stowed position.

In this embodiment, arm 204 extends at an upwards angle from rear wheel 116 to track 208 of sliding mechanism 202. With this arrangement, arm 204 is configured to control linear movement of rear wheel 116 between the extended position outside of outer casing 102 of electric scooter 100 and the stowed position inside of outer casing 102. That is, arm 204 slides along track 208 of sliding mechanism 202 via carrier 206 to retract rear wheel 116 inwards (i.e., in a direction towards front edge 106) and/or to extend rear wheel 116 outwards (i.e., in a direction towards rear edge 108).

In an example embodiment, linking mechanism 200 includes a post member 210 that is attached along an underside of arm 204 via an angled bracket 212. Angled bracket 212 extends downward from the underside of arm 204 and transitions to a substantially horizontal orientation at a bend 214. Post member 210 also includes a post body 216 that extends in an approximately horizontal direction from bend 214 and is aligned with a gear mechanism 220 associated with foot pegs 124. That is, post body 216 of post member 210 is aligned along the direction of movement of sliding mechanism 202 so that post body 216 of post member 210 moves linearly in the horizontal direction when rear wheel 116 is moved between the extended position and the stowed position. In an example embodiment, post body 216 of post member 210 includes an engaging end 218 that is configured to contact gear mechanism 220 to move foot pegs 124 from the open position to the closed position, as will be described in further detail below.

In an example embodiment, linking mechanism 200 also includes a peg support bracket 222 that extends from an underside of track 208 of sliding mechanism 202. Peg support bracket 222 is configured to support and position gear mechanism 220 and foot pegs 124. In some embodiments, peg support bracket 222 extends downwards from the underside of track 208 at an angle and positions gear mechanism 220 and foot pegs 124 so to be substantially aligned with post body 216 of post member 210.

Linking mechanism 200 is configured so that when rear wheel 116 is collapsed or retracted inside outer casing 102 of electric scooter 100, for example, by action of carrier 206 sliding along track 208 of sliding mechanism 202, engaging end 218 of post body 216 contacts gear mechanism 220 causing gear mechanism 220 to rotate or fold foot pegs 124 inwards towards the side surfaces of outer casing 102 of electric scooter 100 to their closed position. In some embodiments, foot pegs 124 are folded into coincidently-shaped recesses 126 in outer casing 102.

Figure 3:
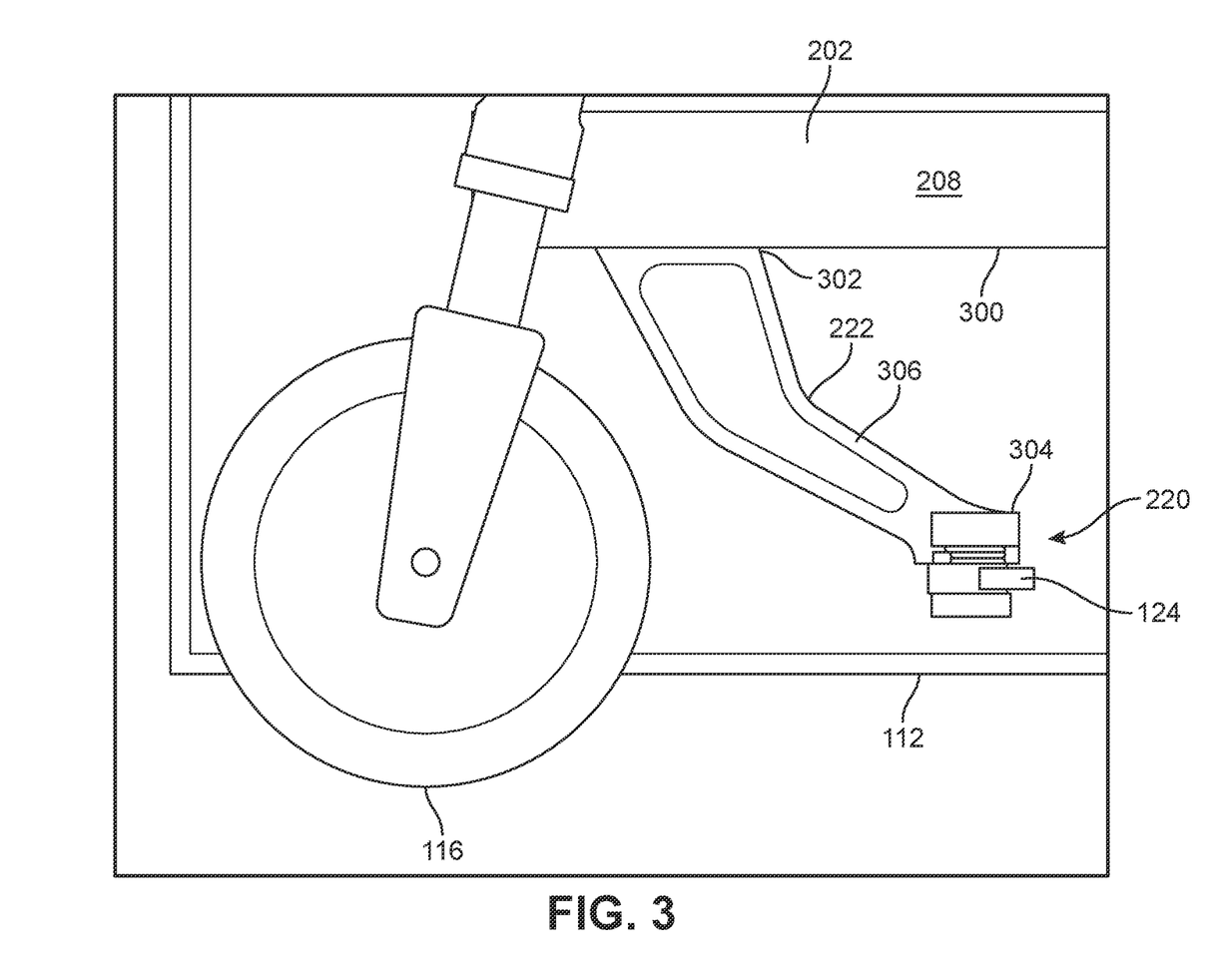
FIG. 3 is an enlarged view of foot pegs of the compact personal transport device in accordance with aspects of the present disclosure.

Referring now to FIG. 3, an enlarged view of foot pegs 124 and gear mechanism 220 is shown. In this embodiment, peg support bracket 222 extends downwards (e.g., towards bottom edge 112) from an underside 300 of track 208 of sliding mechanism 202 at a first end 302. A second end 304 of peg support bracket 222 is attached to gear mechanism 220 and foot pegs 124. Peg support bracket 222 also includes an angled arm 306 that transitions peg support bracket 222 to a substantially horizontal orientation at second end 304 so that gear mechanism 220 and foot pegs 124 are substantially aligned with post body 216 of post member 210. Additionally, as shown in FIG. 3, peg support bracket 222 positions gear mechanism 220 and foot pegs 124 spaced apart a distance above bottom edge 112 of outer casing 102.

Figure 4:
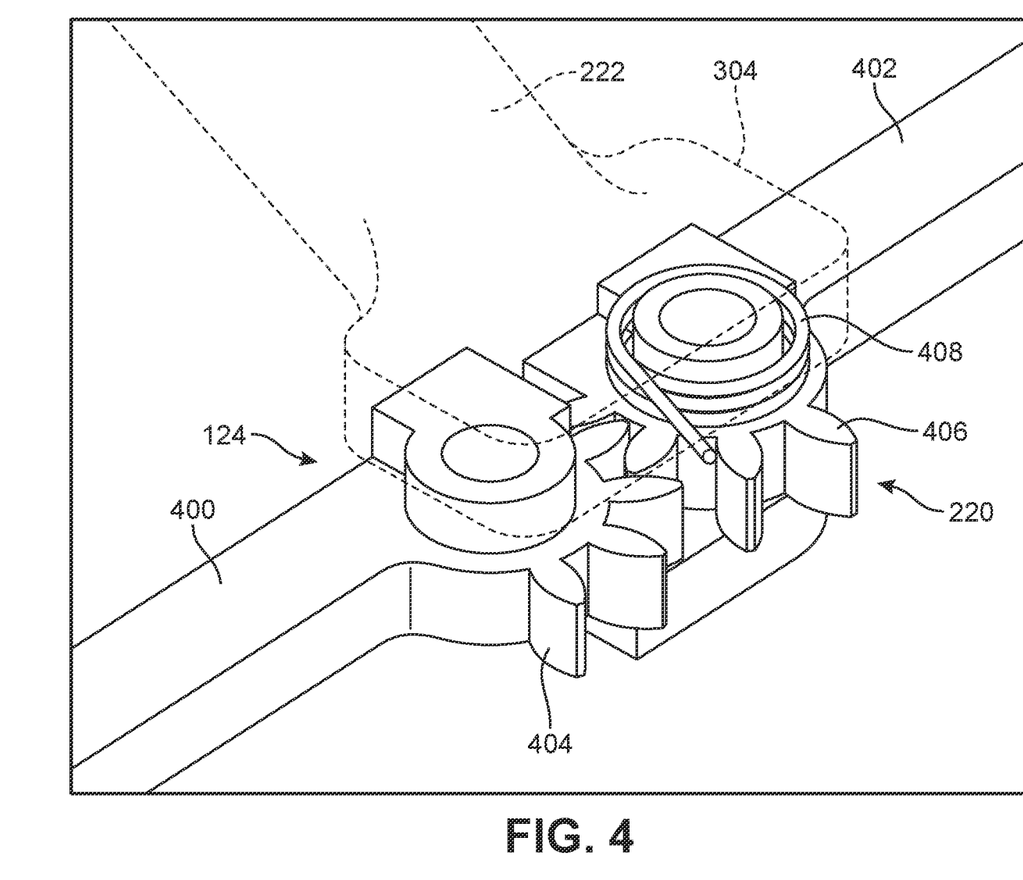
FIG. 4 is an enlarged view of an example embodiment of a rear wheel and foot peg linking mechanism in an open position in accordance with aspects of the present disclosure.
Figure 5:
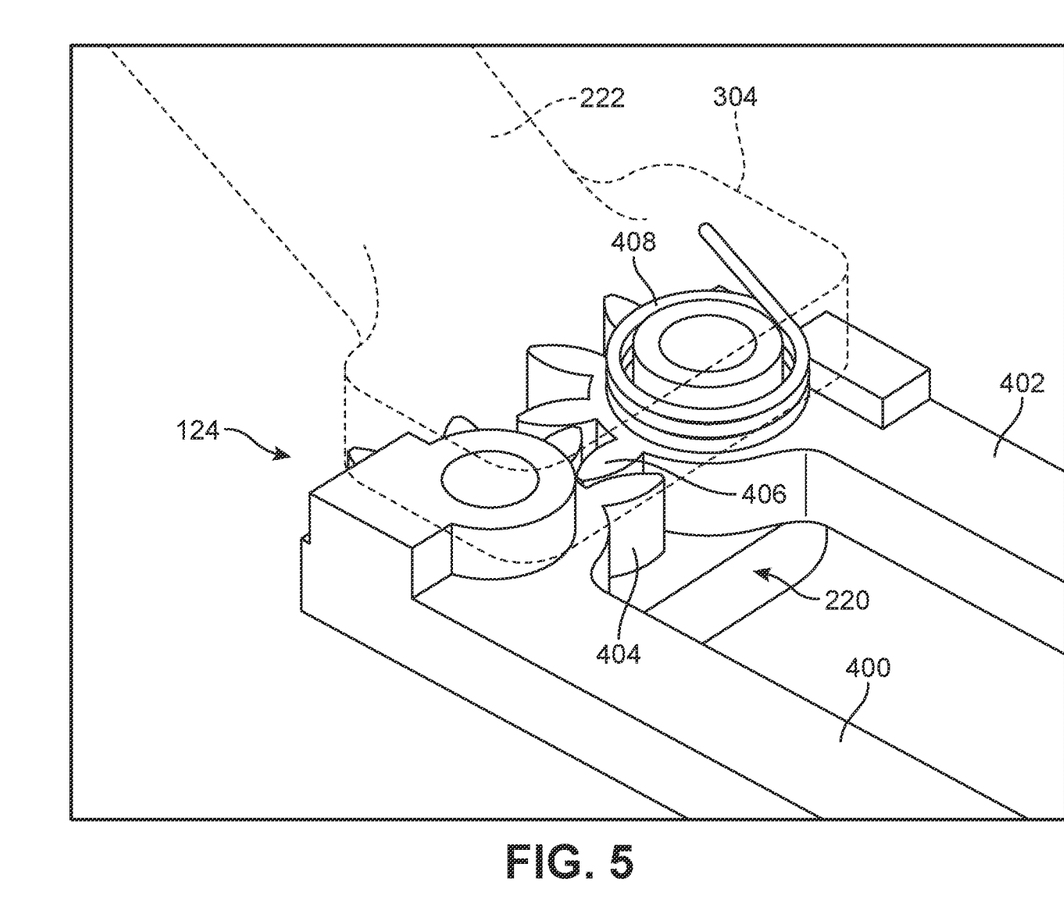
FIG. 5 is an enlarged view of the example embodiment of the rear wheel and foot peg linking mechanism in a closed position in accordance with aspects of the present disclosure.

FIGS. 4 and 5 illustrate enlarged views of an example embodiment of gear mechanism 220 positioned at second end 304 of peg support bracket 222. Referring now to FIG. 4, gear mechanism 220 is shown with foot pegs 124 in an open position. That is, as shown in FIG. 4, foot pegs 124 are extending outwards from the side surfaces of outer casing 102 of electric scooter 100 so that a user may rest or position their feet on foot pegs 124 while riding electric scooter 100 (e.g., in the riding configuration). In an example embodiment, foot pegs 124 are extended outwards to be approximately perpendicular to the side surfaces of outer casing 102 of electric scooter 100 in the riding configuration.

In an example embodiment, foot pegs 124 include a first peg 400 that extends outward on one side of electric scooter 100 and a second peg 402 that extends outward on the opposite side of electric scooter 100. In this embodiment, gear mechanism 220 includes a first set of gears 404 associated with an inner end of first peg 400 and a second set of gears 406 associate with an inner end of second peg 402. Each of first set of gears 404 and second set of gears 406 include a plurality of gear teeth. First set of gears 404 and second set of gears 406 are matched so that first set of gears 404 and second set of gears 406 engage with each other. That is, the individual gear teeth of first set of gears 404 and the individual gear teeth of second set of gears 406 are interleaved or meshed so that a gear tooth of first set of gears 404 is located between two adjacent gear teeth of second set of gears 406. Similarly, a gear tooth of second set of gears 406 is located between two adjacent gear teeth of first set of gears 404. With this arrangement, first peg 400 and second peg 402 are mechanically connected by first set of gears 404 and second set of gears 406 of gear mechanism 220 so that first peg 400 and second peg 402 move in unison between the open position and the closed position.

In an example embodiment, gear mechanism 220 may further include at least one bias spring, such as a bias spring 408. Bias spring 408 may be a coiled spring or similar mechanism that is configured to bias foot pegs 124 in one position, absent action by another force or mechanism (e.g., engaging end 218 of post body 216). In this embodiment, bias spring 408 biases foot pegs 124, including first peg 400 and second peg 402, in the open position as shown in FIG. 4. When engaging end 218 of post body 216 of linking mechanism 200 contacts gear mechanism 220, the force of bias spring 408 is released, thereby allowing foot pegs 124 to rotate or fold inwards from the open position to the closed position. While only a single bias spring 408 is shown in FIG. 4, in other embodiments one or more additional bias springs may be provided.

Referring now to FIG. 5, gear mechanism 220 is shown with foot pegs 124 in a closed position. That is, as shown in FIG. 5, foot pegs 124, including first peg 400 and second peg 402, are folded inwards towards the side surfaces of outer casing 102 of electric scooter 100 so that electric scooter 100 may be stowed (e.g., in the stowed configuration). In this embodiment, first set of gears 404 and second set of gears 406 of gear mechanism 220 have rotated approximately 90 degrees to transition first peg 400 and second peg 402 from the open position (shown in FIG. 4) to the closed position (shown here in FIG. 5). In an example embodiment, foot pegs 124, including first peg 400 and second peg 402, may be folded into correspondingly-shaped recesses (e.g., recess 126, shown in FIGS. 1 and 2) on the side surfaces of outer casing 102 of electric scooter 100. With this arrangement, foot pegs 124 in the closed position are folded into the recesses so as to be flush with the side surfaces of outer casing 102 and to provide a substantially smooth surface.

Figure 6:
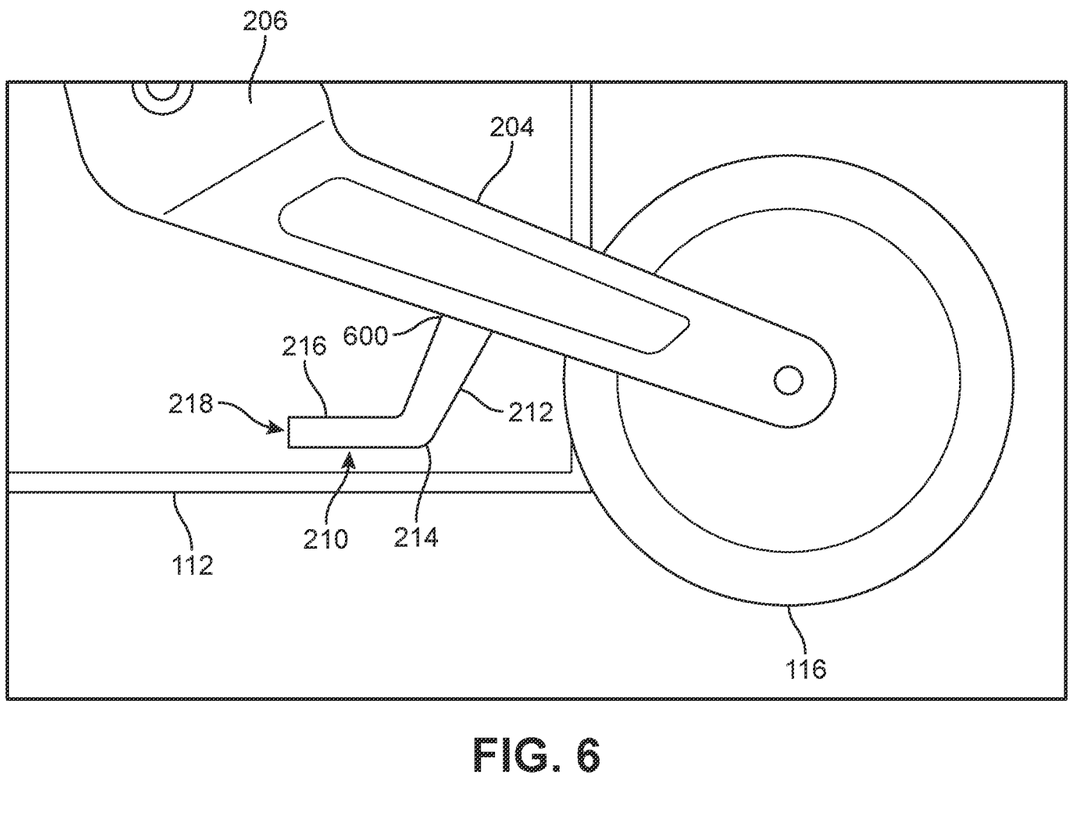
FIG. 6 is an enlarged view of an example embodiment of a rear wheel arm attached to a sliding mechanism in accordance with aspects of the present disclosure.

Referring now to FIG. 6, an enlarged view of arm 204 connected to rear wheel 116 and attached to sliding mechanism 202 via carrier 206 is shown. As described above, in an example embodiment, post member 210 is attached along an underside 600 of arm 204 via angled bracket 212. Angled bracket 212 extends downward from underside 600 of arm 204 and transitions from an angled vertical direction to a horizontal direction at bend 214. Post body 216 extends outward from bend 214 in an approximately horizontal direction to engaging end 218. Post body 216 of post member 210 is aligned along the direction of movement of sliding mechanism 202 so that post body 216 of post member 210 moves linearly in the horizontal direction when rear wheel 116 is moved between the extended position and the stowed position (e.g., via sliding mechanism 202). Engaging end 218 of post body 216 of post member 210 is configured to contact first set of gears 404 and second set of gears 406 of gear mechanism 220 to move foot pegs 124 from the open position to the closed position, as described above in reference to FIGS. 4 and 5.

Figure 7:
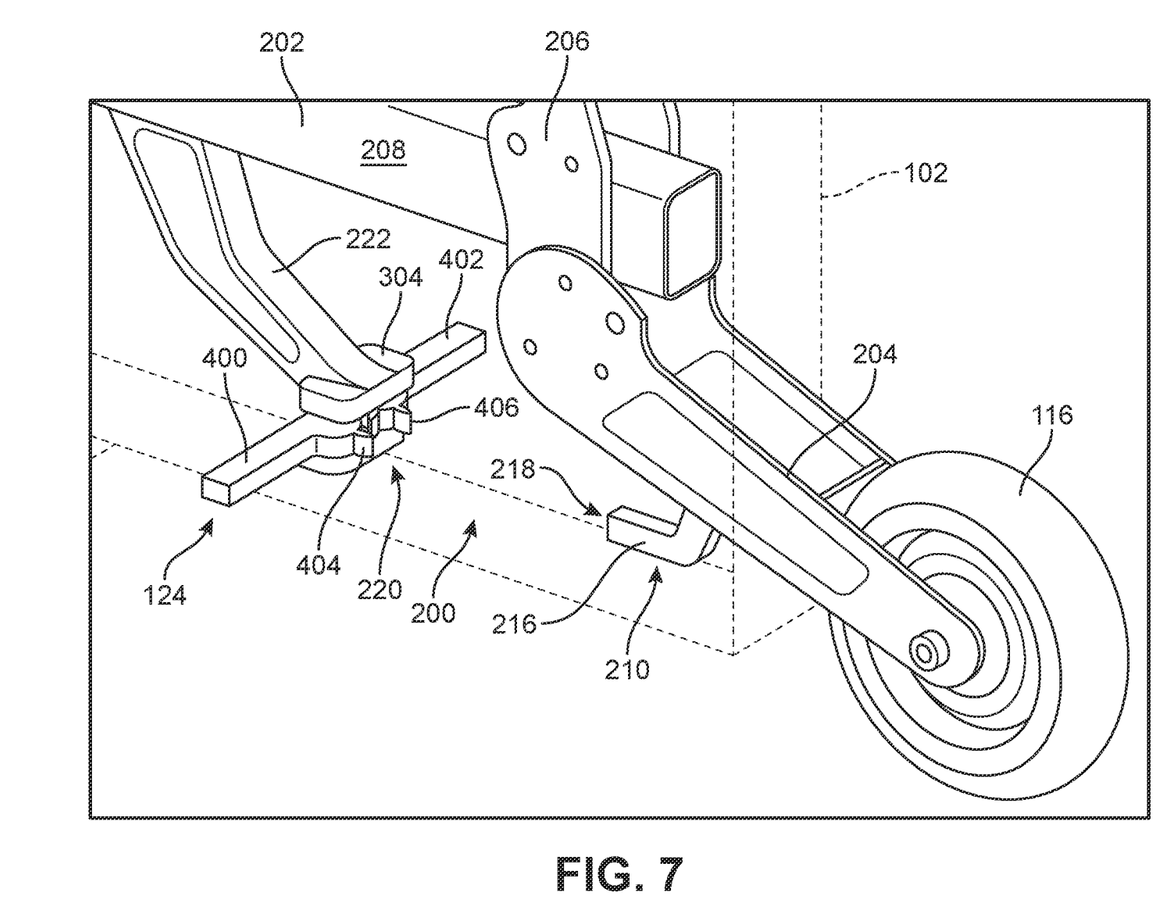
FIGS. 7-10 illustrate representative views of the example embodiment of the rear wheel and foot peg linking mechanism in use to cause the foot pegs to fold inwards to the closed position when the rear wheel extends into the outer casing of the compact personal transport device in accordance with aspects of the present disclosure.
Figure 8:
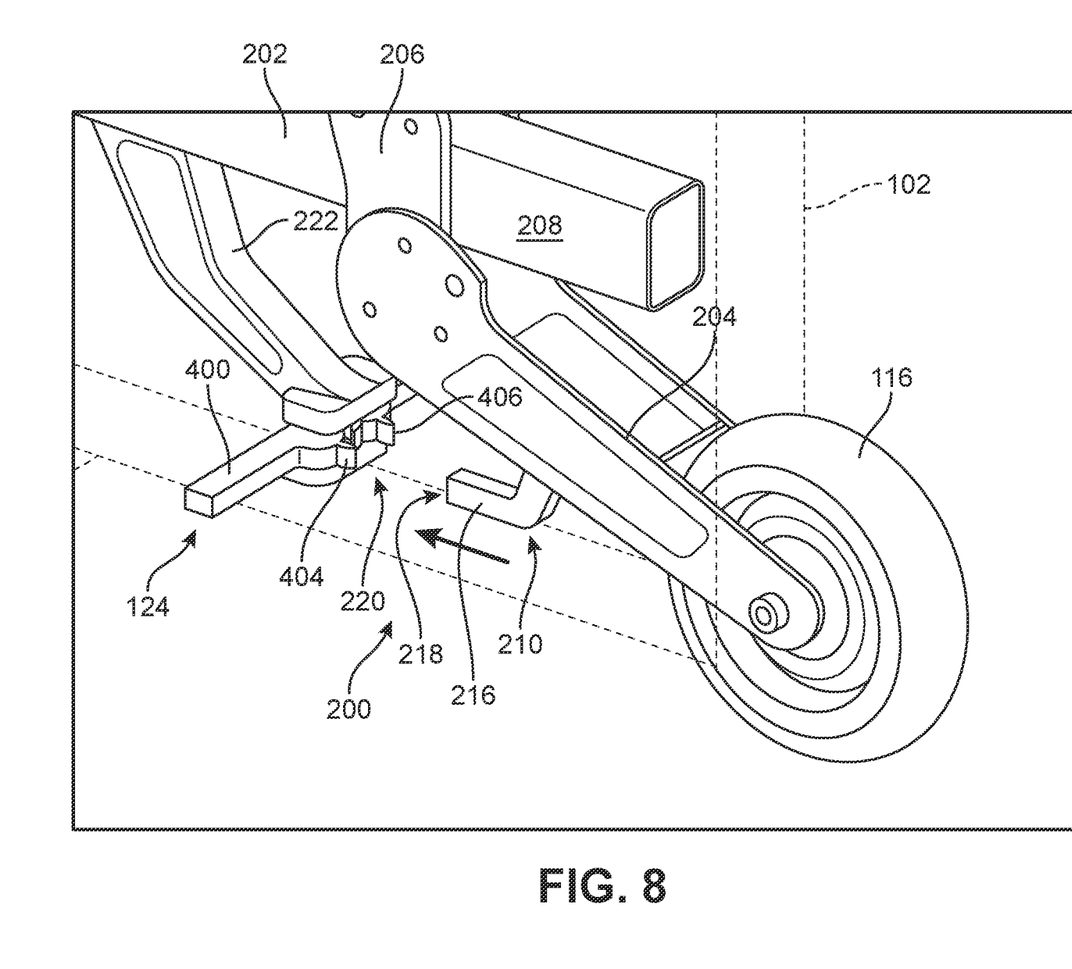
Figure 9:
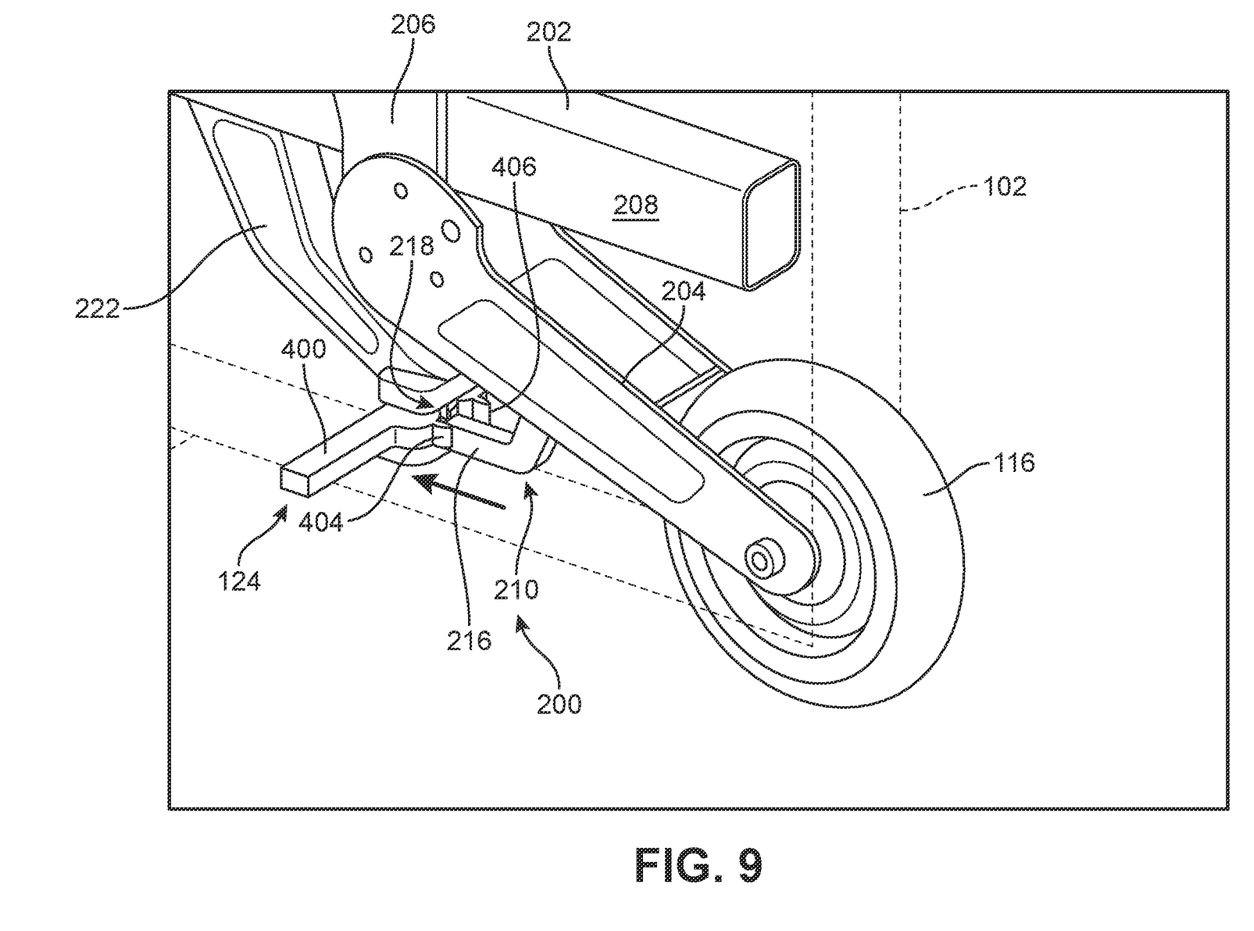
Figure 10:
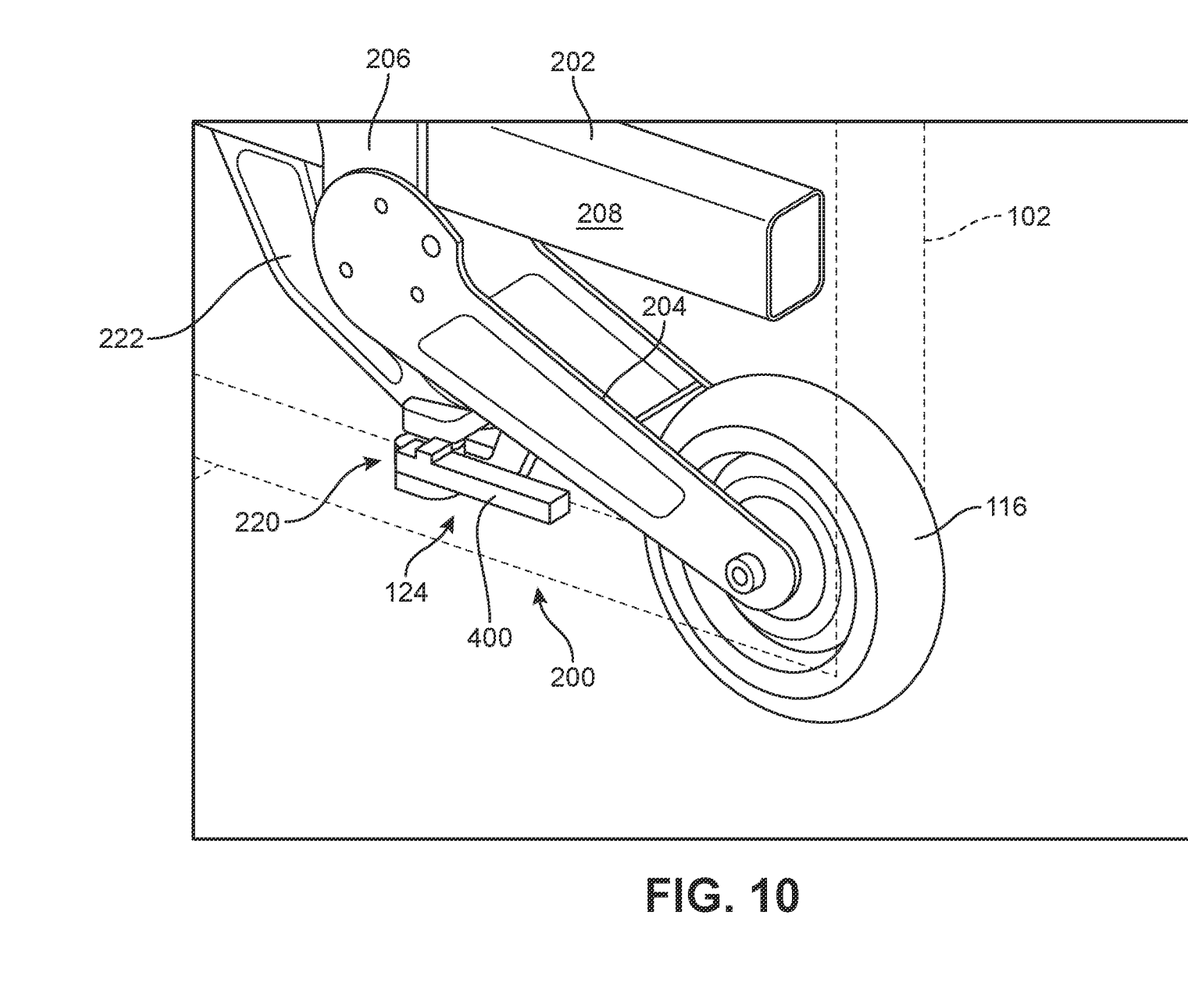

In an example scenario, a process of using rear wheel and foot peg linking mechanism 200 to automatically move or transition foot pegs 124 from the open position to the closed position when rear wheel 116 moves into the retracted or stowed position is shown with reference to FIGS. 7-10. Referring now to FIG. 7, electric scooter 100 is shown in the riding configuration with rear wheel 116 fully extended out of outer casing 102. In accordance with the principles of the example embodiments described herein, linking mechanism 200 is provided to cause foot pegs 124, including first peg 400 and second peg 402, to automatically fold inward from the open position (as shown here in FIG. 7) to the closed position (as shown in FIG. 10 below).

In an example embodiment, linking mechanism 200 includes post member 210 having post body 216 including engaging end 218 attached to arm 204 of rear wheel 116 and gear mechanism 220 attached at second end 304 of peg support bracket 222. In this embodiment, post body 216 is aligned along a horizontal direction with gear mechanism 220 so that when rear wheel 116 moves inwards, engaging end 218 of post body 216 is configured to contact first set of gears 404 and second set of gears 406 of gear mechanism 220 to mechanically cause first peg 400 and second peg 402 to fold or rotate inwards to the closed position.

Referring now to FIG. 8, rear wheel 116 is shown moving inwards from the extended position outside of outer casing 102 to collapse or stow rear wheel 116 as part of the process of transitioning electric scooter 100 from the riding configuration to the stowed configuration. In an example embodiment, sliding mechanism 202 is configured to move rear wheel 116 inwards by sliding carrier 206 of arm 204 along track 208 of sliding mechanism 202. This linear movement of rear wheel 116 also causes post body 116 of post member 210 to move linearly in the horizontal direction towards gear mechanism 220 and foot pegs 124.

Next, FIG. 9 illustrates rear wheel 116 continuing to move inwards to the stowed position inside of outer casing 102. For example, as shown here in FIG. 9, rear wheel 116 is partially inside of outer casing 102 of electric scooter 100. In this embodiment, engaging end 218 of post body 216 is brought close to contacting first set of gears 404 and second set of gears 406 of gear mechanism 220. As shown in FIG. 9, engaging end 218 of post body 216 is not yet applying enough force to overcome the force provided by bias spring 408 that keeps foot pegs 124 in the open position (i.e., extending out perpendicularly from the side surfaces of outer casing 102 of electric scooter 100.

Referring now to FIG. 10, rear wheel 116 is shown in the fully stowed position inside outer casing 102 when electric scooter 100 is in the stowed configuration. In the stowed configuration, linking mechanism 200 causes foot pegs 124, including first peg 400 and second peg 402, to automatically fold inward from the open position to the closed position, as shown here in FIG. 10. In an example embodiment, engaging end 218 of post body 216 of post member 210 contacts first set of gears 404 and second set of gears 406 of gear mechanism 220 and causes gear mechanism 220 to rotate to fold foot pegs 124 inwards to the closed position. For example, in one embodiment first set of gears 404 and second set of gears 406 of gear mechanism 220 rotate approximately 90 degrees to fold first peg 400 and second peg 402 inwards to the closed position. The contact force provided by engaging end 218 of post body 216 hitting or contacting gear mechanism 220 when arm 204 slides along sliding mechanism 202 to retract or stow rear wheel 116 overcomes the force provided by bias spring 408, thereby allowing or permitting foot pegs 124 to automatically transition from the open position to the closed position.

The process shown in FIGS. 7-10 illustrates the transition of electric scooter 100 from the riding configuration to the stowed configuration and the associated automatic retraction or folding of foot pegs 124 from the open position to the closed position (e.g., folded along the side surfaces of outer casing 102 of electric scooter 100). It should be understood that the opposite process may also be followed to automatically extend or open foot pegs 124 from the closed position to the open position when rear wheel 116 is pulled or extended outwards when electric scooter 100 transitions from the stowed configuration to the riding configuration.

For example, as described above in reference to FIGS. 4 and 5, a bias mechanism (e.g., bias spring 408) may act to push foot pegs 124 outwards away from the side surfaces of electric scooter 100 when post member 210 (e.g., engaging end 218 of post body 216) is removed from contact with gear mechanism 220. When post member 210 is moved away from gear mechanism 220 as rear wheel 116 is pulled outwards (e.g., away from gear mechanism 220), bias spring 408 is no longer restrained and it may act to automatically move foot pegs 124 outwards to extend from the side surfaces of electric scooter 1000.

By using linking mechanism 200 of the example embodiments, electric scooter 100 may be easily transitioned between the riding configuration and the stowed configurations. With this arrangement, electric scooter 100 may be a convenient personal transport device for a user to travel for "last-mile" or "first-mile" trips to a destination in the riding configuration and can be quickly converted to the stowed configuration to allow the user to carry or transport once they reach their destination.

While various embodiments of the disclosure have been described, the description is intended to be exemplary, rather than limiting and it will be apparent to those of ordinary skill in the art that many more embodiments and implementations are possible that are within the scope of the disclosure. Accordingly, the disclosure is not to be restricted except in light of the attached claims and their equivalents. Also, various modifications and changes may be made within the scope of the attached claims.

The invention claimed is:

1. A rear wheel and foot peg linking mechanism for a personal transport device comprising:

foot pegs, including a first peg and a second peg;

a gear mechanism connected to the foot pegs, the gear mechanism configured to rotate to move the foot pegs between an open position and a closed position;

an arm connected at one end to a rear wheel of the personal transport device; and a post member extending downward from an underside of the arm via an angled bracket;

wherein the post member is configured to contact the gear mechanism to cause the gear mechanism to move the foot pegs from the open position to the closed position.

2. The rear wheel and foot peg linking mechanism according to claim 1, wherein the gear mechanism includes a first set of gears at an inner end of the first peg and a second set of gears at an inner end of the second peg.

3. The rear wheel and foot peg linking mechanism according to claim 2, wherein the first set of gears and the second set of gears are meshed so that a gear tooth of the first set of gears is located between two adjacent gear teeth of the second set of gears.

4. The rear wheel and foot peg linking mechanism according to claim 1, wherein the gear mechanism further includes a bias spring;

wherein the bias spring is configured to bias the foot pegs in the open position.

5. The rear wheel and foot peg linking mechanism according to claim 1, wherein the gear mechanism rotates 90 degrees to move the foot pegs between the open position and the closed position.

6. The rear wheel and foot peg linking mechanism according to claim 1, wherein the post member includes a post body having an engaging end; and wherein the engaging end is configured to contact at least one gear tooth of a set of gears of the gear mechanism to cause the foot pegs to move from the open position to the closed position.

7. The rear wheel and foot peg linking mechanism according to claim 1, wherein the gear mechanism and the post member are aligned in a horizontal direction.

8. The rear wheel and foot peg linking mechanism according to claim 1, wherein the angled bracket transitions from an angled vertical direction at the underside of the arm to a horizontal direction at a bend.

9. The rear wheel and foot peg linking mechanism according to claim 8, wherein the post member includes a post body that extends outward from the bend of the angled bracket in an approximately horizontal direction to an engaging end.

10. The rear wheel and foot peg linking mechanism according to claim 1, further comprising a peg support bracket configured to support and position the gear mechanism and the foot pegs.

11. The rear wheel and foot peg linking mechanism according to claim 10, wherein the peg support bracket positions the gear mechanism and the foot pegs so as to be substantially aligned with a post body of the post member in a horizontal direction.

* * * * *